United States Patent [19]
Handy

[11] Patent Number: 5,161,472
[45] Date of Patent: Nov. 10, 1992

[54] MULTI-FUNCTION DRAFT IMPLEMENT

[76] Inventor: Barry L. Handy, P.O. Box 2520, Scobey, Mont. 59263

[21] Appl. No.: 598,561

[22] Filed: Oct. 9, 1990

Related U.S. Application Data

[63] Continuation of Ser. No. 8,651, Jan. 28, 1987, abandoned, which is a continuation-in-part of Ser. No. 907,128, Sep. 11, 1986, abandoned, which is a continuation of Ser. No. 595,477, Mar. 30, 1984, abandoned.

[51] Int. Cl.$^5$ ................................................ A01C 5/00
[52] U.S. Cl. ......................................... 111/73; 111/84; 111/34; 111/52; 111/900; 172/176; 172/721
[58] Field of Search ................... 111/73, 84, 85, 1, 34, 111/52, 80, 86, 900; 172/724, 176; 47/1, 56

[56] References Cited

U.S. PATENT DOCUMENTS

| | | | |
|---|---|---|---|
| 486,416 | 11/1892 | Woodbury | 172/705 X |
| 1,044,532 | 11/1912 | Johnson | 172/705 |
| 1,921,885 | 8/1933 | Kriegbaum | 111/900 X |
| 2,159,652 | 5/1939 | Brunner | 111/86 |
| 2,577,363 | 12/1951 | Poynor | 111/80 X |
| 2,579,734 | 12/1951 | Burgesser | 47/57.6 |
| 2,913,086 | 11/1959 | Wade | 111/86 |
| 3,033,135 | 5/1962 | Gouin | 111/85 X |
| 3,304,895 | 2/1967 | Orendorff | 172/382 X |
| 3,336,885 | 8/1967 | Lebow | 111/85 |
| 3,797,418 | 3/1974 | Bridger | 111/85 X |
| 4,129,082 | 12/1978 | Betulius | 111/7 |
| 4,167,910 | 9/1979 | Pretzer | 111/900 X |
| 4,393,791 | 7/1983 | Suderman | 111/34 |
| 4,396,608 | 8/1983 | Handy | 111/85 X |
| 4,417,530 | 11/1983 | Kopecky | 111/73 |
| 4,520,742 | 6/1985 | Anderson | 111/86 |
| 4,565,141 | 1/1986 | Kopecky | 111/7 |
| 4,674,419 | 6/1987 | Kopecky | 111/73 |
| 4,686,914 | 8/1987 | Schaff et al. | 111/73 |
| 4,726,304 | 2/1988 | Dreyer et al. | 111/73 |
| 4,762,075 | 8/1988 | Halford | 111/73 |
| 4,770,112 | 9/1988 | Neumeyer | 111/73 |
| 4,831,945 | 5/1989 | Neumeyer | 111/73 |

FOREIGN PATENT DOCUMENTS

| | | | |
|---|---|---|---|
| 244384 | 3/1960 | Australia | 111/73 |
| 741567 | 8/1966 | Canada | 111/85 |
| 973007 | 8/1975 | Canada | 111/85 |
| 411765 | 3/1925 | Fed. Rep. of Germany | 111/86 |
| 385587 | 12/1923 | Fed. Rep. of Germany | 111/85 |
| 2016756 | 6/1978 | Fed. Rep. of Germany | 111/80 |
| 581901 | 11/1977 | U.S.S.R. | 111/73 |
| 1360964 | 7/1974 | United Kingdom | 111/7 |

Primary Examiner—Randolph A. Reese
Assistant Examiner—Timothy Aberle
Attorney, Agent, or Firm—Hovey, Williams Timmons & Collins

[57] ABSTRACT

A multi-function draft implement for opening, seeding, and fertilizing is disclosed. The implement provides a vertical knife opener for creating a vertical trench in the ground, a horizontal sweep for opening a horizontal swath in the ground and creating a seed-supporting shelf. The seed-supporting shelf thus created allows the seeds to be deposited on the shelf on either side of the vertical trench. Fertilizer can be placed in the vertical trench and the ground is replaced over the shelf-supported seed and fertilizer. In one embodiment, the vertical knife is biased with respect to the horizontal sweep and depth-controlling ground-engaging wheels are provided for controlling the depth of the planting sweep. In another embodiment, the vertical knife and the horizontal sweep are in adjustable fixed relation. The implement allows for no till, minimum till, and conventional till planting operations with precise seed placement and a single-pass multiple ground preparation seeding, fertilizing, and herbicide application. The planting sweep allows seed placement in parallel paired rows in proper position with the deposited fertilizer in the trench between the rows to maximize yield. Depth control is provided with parallel linkage and the use of ground-engaging packer wheels, colter wheel, or a combination. Methods of single-pass and minimum tillage fertilizing and paired row planting are also disclosed.

36 Claims, 5 Drawing Sheets

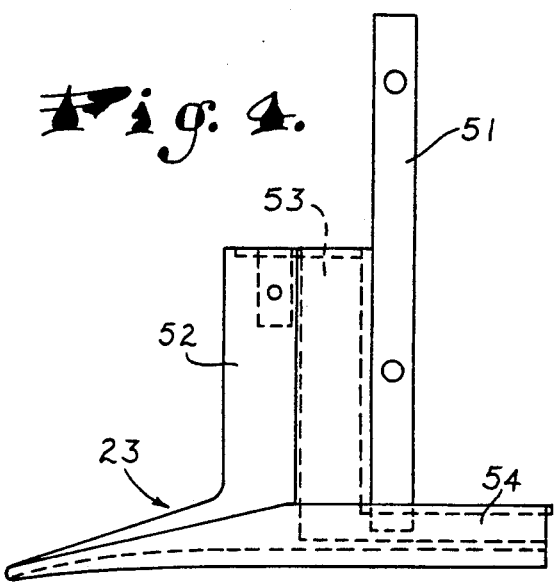
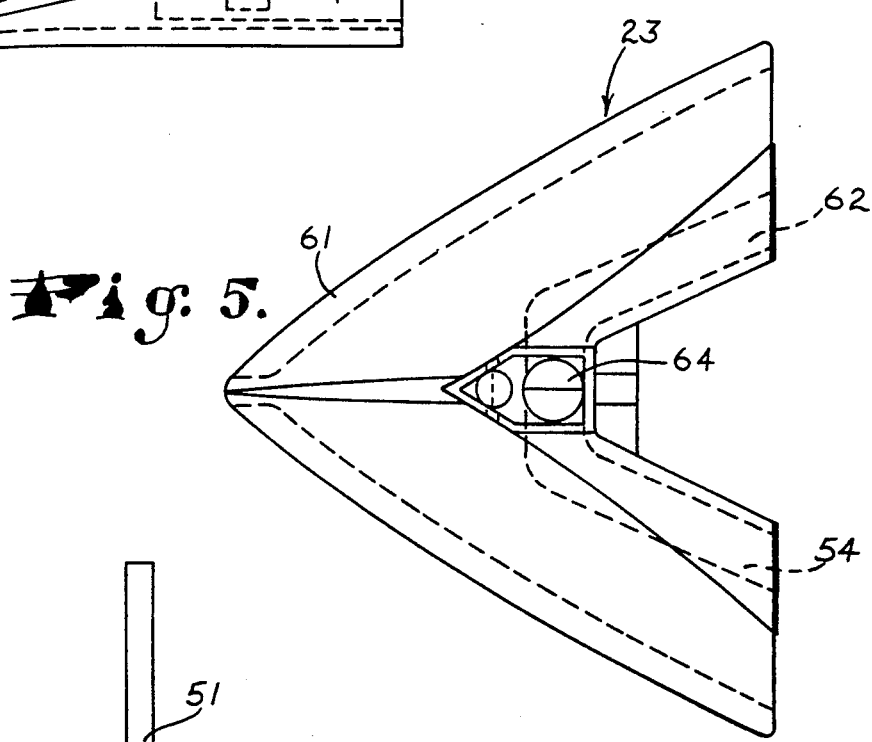
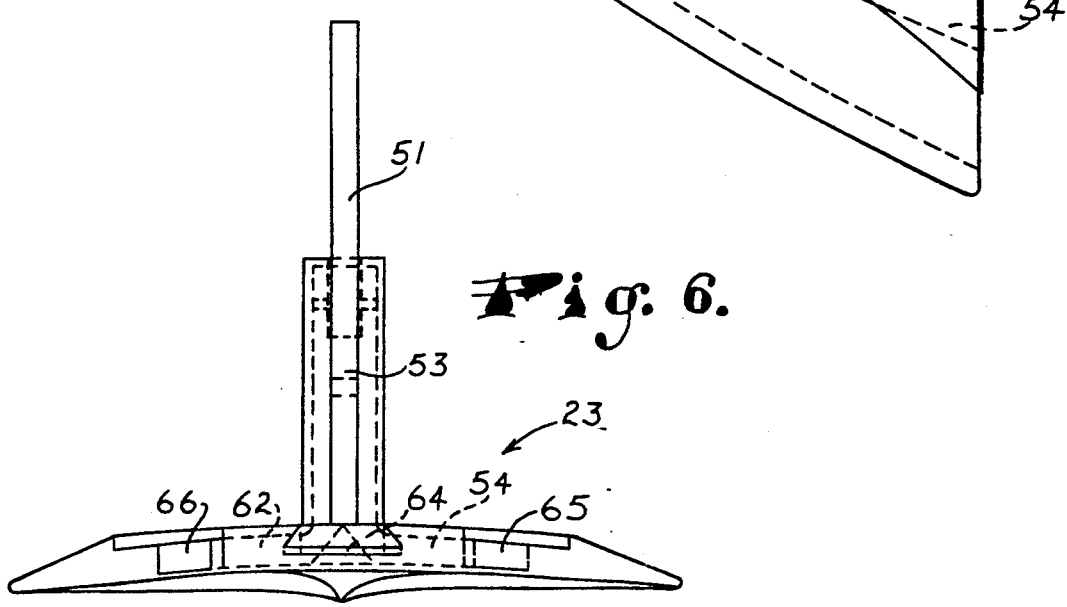

MULTI-FUNCTION DRAFT IMPLEMENT

CROSS REFERENCE TO RELATED APPLICATION

This application is a continuation of Ser. No. 07/008,651 filed Jan. 28, 1987, now abandoned, which is a continuation-in-part of prior co-pending application Ser. No. 06/907,128 filed Sep. 11, 1986, now abandoned, which is a continuation of prior co-pending Ser. No. 06/595,477 filed Mar. 30, 1984, now abandoned.

BACKGROUND OF THE INVENTION

Historically, no till, minimum till, and conventional till planting operations require different implements to accomplish the desired results. Trash clearance, trash avoidance, ground shattering and soil conditions vary, depending on whether one uses no till, minimum till, or conventional till planting. It would be highly desirable if ground preparation, seeding, and fertilizing and herbicide applications can be accomplished with a minimum amount of equipment. Further, single-pass, multiple-ground preparation, seeding, fertilizing, and herbicide operations can be accomplished with expenditures of considerably less man-hours of labor and at a considerable fuel savings. Still further, complete ground preparation, fertilizing, and seeding operations may be performed during a smaller favorable weather "window," whether one uses no till, minimum till, or conventional till planting.

The lateral placement of seeds as well as the depth of seed placement have both been shown to be critical to crop yields. Studies have shown that consistent depth of seeding can affect yields by twenty percent or more.

Lateral placement of seeds with respect to fertilizer placement can affect yield to a great extent. The placement of seeds directly over or under the fertilizer bands can damage the germinating seed whereas the placement of seeds too far to either side of a fertilizer band doesn't allow the growing plant to reach the fertilizer.

Accordingly, a need exists for a multifunction draft implement which will be capable of efficient single-pass ground preparation, fertilizing, seeding, and herbicde application functions in which the seed placement is optimized for depth and lateral placement.

In addition, in the interest of maximum beneficial use of fertilizer, a need exists for a more efficient planting and fertilizing operation wherein the seed is placed in twin parallel rows straddling the fertilizer. There is also a need for a planting and fertilizing operation in which the resulting field allows for very little soil erosion and efficient use of available water.

SUMMARY OF THE INVENTION

The multi-function draft implement of the instant invention has been designed to perform no till, minimum tillage, and conventional planting operations; to deep band maturing plant growth fertilizer; to plant seeds along with starter fertilizer; and to pack the soil over the planted seed as well as cut ground trash along paths paralleling the seeded rows. Still further, the multi-function draft implement is also operative to narrow row plant seeds in a pair of parallel paths disposed on opposite sides of a deep banded fertilizer path.

The main object of this invention is to provide a multi-function draft implement which will be capable of single-pass ground preparation, seeding, and fertilizing operations.

Another object of this invention is to provide a draft implement constructed in a manner whereby the depth of seed planting may be adjusted and maintained substantially constant, even though the associated banding knife may vary considerably in depth due to irregular terrain.

Another very important part of this invention is to provide a ground preparation and seeding implement which will be capable of deep banding maturing plant growth fertilizer while at the same time shallow planting seed together with starter fertilizer in paths parallelling and disposed on opposite sides of the deep banding and fertilizer path.

Another object of this invention is to provide a draft implement including structure for packing the earth over the relatively shallow seed paths.

Another object of the invention is to provide a draft implement that provides a sweep that cleans out the planted area so that the amount of residue on the new crop is reduced.

Another object of the invention is to provide a draft implement providing a sweep having pitch adjustment.

Another object of the invention is to provide a draft implement for planting in which the seed is forced out of the sweep by use of an air seeder.

Another object of the invention is to provide a draft implement for planting in which the seed placement is alternating in parallel rows.

Another object of the invention is to provide a draft implement in which the ground is prepared to provide a seed-supporting shelf on either side of a vertical trench.

Another object of the invention is to provide a draft implement for planting crops in which the seeds are spaced so that the growing plants' root mass concentration crowds out weeds.

Another object of the invention is to provide a draft implement that is capable of deepband fertilizing without the use of a horizontal opening sweep.

Another object of the invention is to provide a draft implement having packer wheels in which the down pressure on the packer wheels is independently controlled.

Another object of the invention is to provide a draft implement for planting and fertilizing in which the box containing fertilizer and seed is provided with dual compartments.

Another object of the invention is to provide a draft implement for planting having a colter wheel which pre-opens the ground, thus allowing the following vertical knife opener to further open the ground, minimizing ground shattering.

Another object of the invention is to provide a draft implement for planting having a narrow vertical opening knife.

Another object of the invention is to provide a draft implement for planting having a vertical knife and a pair of double disc openers which open the ground in paired rows for planting.

Another object of the invention is to provide a multi-function implement in which the vertical opener and the horizontal opener are in fixed spaced relation so that seed placement and fertilizer placement maintain a constant relationship.

Still another object of this invention is to provide a draft implement capable of controlled seed depth planting as well as ground trash cutting along remote sides of parallel narrow seed planted rows.

Yet another object of this invention is to provide a multi-function implement which will also be capable of rod weeding operations during the ground preparation, fertilizing, and seeding operations.

A final object of this invention to be specifically enumerated is to provide a multi-function draft implement in accordance with the preceding objects and which will conform to conventional forms of manufacture, be of simple construction and easy to use so as to provide a device that will be economically feasible, long-lasting, and dependable in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 4 is a partial side elevational view of the planting sweep of the instant invention;

FIG. 5 is a top plan view of the planting sweep of the instant invention;

FIG. 6 is a partial rear view of the planting sweep of the instant invention;

DESCRIPTION OF THE PREFERRED EMBODIMENT

Figure 1:
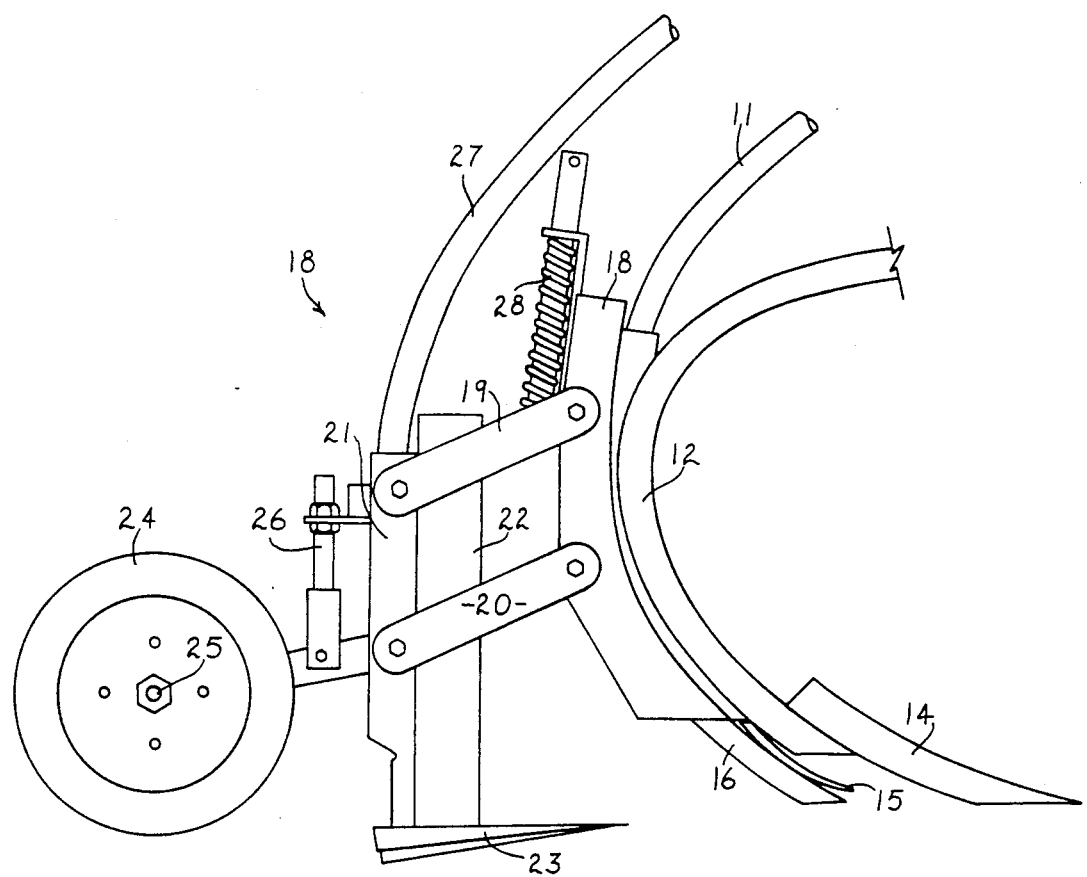
FIG. 1 is a side elevational view of the multi-function implement of the instant invention in which depth control is provided by parallel linkage and in association with trailing packer wheels.

Referring now more specifically to the drawings, the numeral 10 generally designates a multi-function draft implement. Referring to FIG. 1, the implement of the invention includes an upstanding tool shank 12 whose upper end is adapted for support from a suitable tool bar (not shown). The lower end of the shank 12 supports a banding knife 14 therefrom on the forward side of the shank 12 and the lower end of a fertilizer tube 16 from the rear side thereof. The shank 12 includes a rearwardly projecting bracket 18 from whose rear end parallel linkage bars 19 and 20 are pivotally supported. An upstanding tubular housing 21 is pivotally attached to parallel linkage bars 19 and 20 so that tubular housing 21 can move up and down in parallel relationship to bracket 18. Tubular housing 21 is further provided with ground-deflecting forward portion 22 and planting sweep 23. Tubular housing 21 is further adjustably attached to packer wheels 24 which pivot about bearing 25 and engage or rest on the ground. The vertical relationship of packer wheels 24 to tubular housing 21 and thus planting sweep 23 can be adjusted by means of adjustment linkage 26 so that the control of planting sweep 23 is adjusted independent of banding knife 14. It is contemplated that the planting implement 10 of the invention is connected to an air seeder of the type using air pressure to force seeds down a conduit 27 for planting. Conduit 27 is an open conduit in air communication with tubular housing 21 as well as planting sweep 23.

The amount of pressure on packer wheels 24 is controlled by down pressure spring 28 which is attached to parallel linkage bar 19 and rigidly attached to bracket 18.

It can be seen that by the planting arrangement as depicted in FIG. 1 that planting sweep 23's depth is controlled by the adjustment 26 of packer wheel 24 with respect to bracket 18.

Anhydrous fertilizer tube 15 is further supported by bracket 18. Fertilizer tube 16 is in fluid communication with fertilizer conduit 11 to provide granular or liquid fertilizer whereas anhydrous conduit 15 located behind knife 14 provides anhydrous fertilizer in the trench created by banding knife 14.

Figure 2:
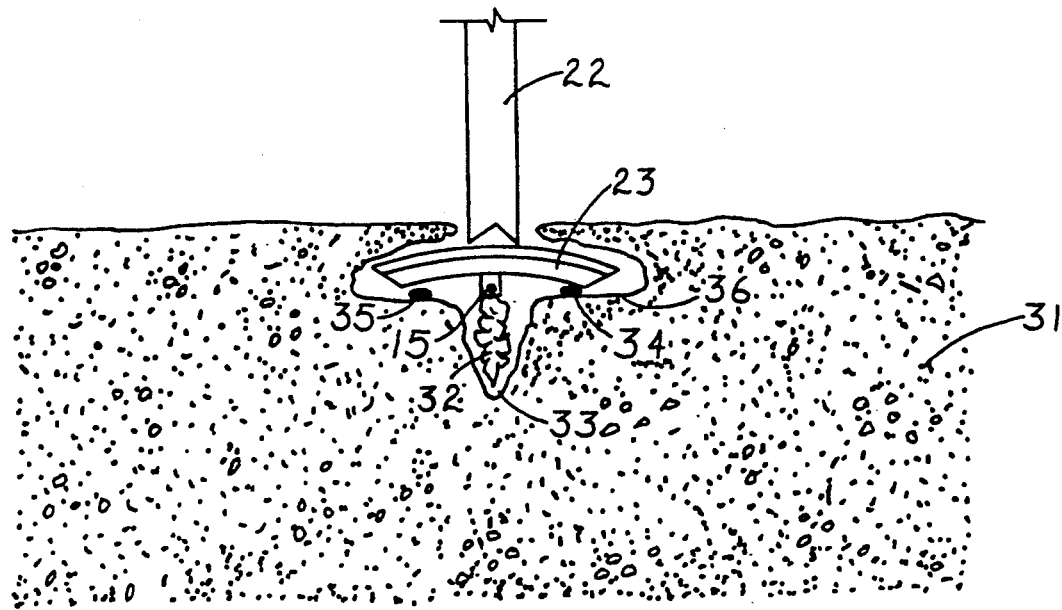
FIG. 2 is a partial rear view of the multi-function implement of the instant invention showing the depositing of seed and fertilizer in a horizontal swath and a vertical trench in the ground.

As shown in FIG. 2, fertilizer such as anhydrous fertilizer 32 is deposited from anhydrous tube 15 into a vertical trench 33 created by banding knife 14 as depicted in FIG. 1.

It can also be seen from reference to FIG. 2 that seeds 34 and 35 are placed upon a shelf 36 which is the result of sweep 23 having been moved through the ground 31. Seed-supporting shelf 36 keeps the seeds 34 and 35 from falling into or being too close to fertilizer 32 which is deposited at the bottom of vertical trench 33.

Figure 3:
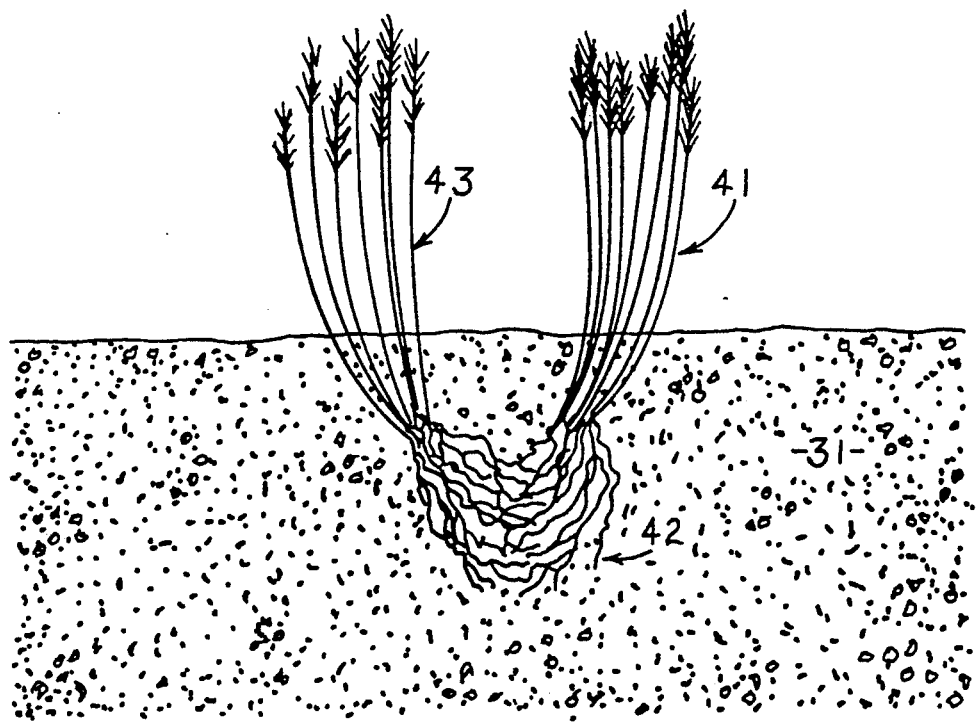
FIG. 3 is a cut-away end view of the paired row of wheat planted in accordance with the instant invention showing the concentration of the root mass in the area of fertilizer placement.
Figure 11:
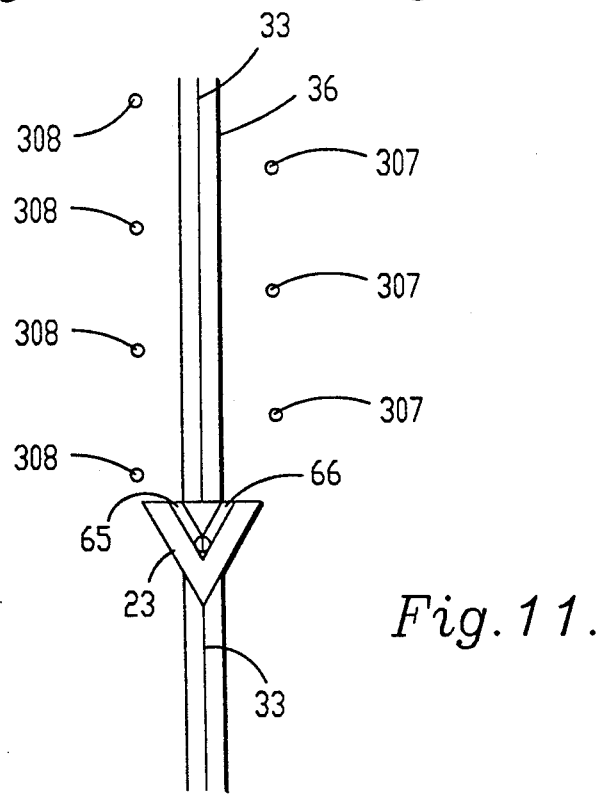
FIG. 11 is a top plan view of the seeding sweep of the instant invention showing seeds deposited on the seed-supporting shelf.

Plants 41 and 43 were initially seeds deposited upon seed-supporting shelf 36 as shown in FIG. 2. When the plants matured as depicted in FIG. 3, the plants then grew in a parallel row fashion. The seeds 34 and 35 as deposited on seed shelf 36 can be deposited by seeding sweep 23 by the use of an air system so that the seeds are not in direct relationship with one another but rather staggered to provide even a greater yield. The staggered relationship is depicted in FIG. 11.

With reference to FIG. 4 where seeding shoe 23 is shown in side view. Seeding shoe 23 is provided with a mounting bracket 51, a leading edge 52, a vertical seed passageway 53 and horizontal seed passageway 54. It can be seen that planting sweep 23 of the invention by having a horizontal planform as depicted in FIG. 5 creates a horizontal shelf 36 as depicted in FIG. 2 when drawn through the ground 31.

Referring now to FIG. 5 where it can be seen that leading edge 61 of planting shoe 23 moves in a conventional manner to pass through the ground. The horizontal seed passages 54 and 62 are provided to place the seed on either side of the vertical trench that was created by banding knife 14. A seed divider or seed splitter 64 is provided to divide the seeds coming through vertical seed conduit 53. It has been found that by having rippled side walls of vertical passage 53 in the manner of a culvert or parallel indentations, that the seed being forced through the air system will swirl in a manner so that seeds being divided by seed divider 64 will alternate first to one side such as seed passage 54 and then to the opposite side, seed passage 62, so that they are deposited on seed-supporting shelf 36 in an alternating fashion albeit parallel and on either side of vertical trench 33 as shown in FIG. 11.

Referring now to FIG. 6 where it is shown that seed passage 53 and seed divider 64 are in pneumatic communication with horizontal seed passages 54 and 62 so that the seeds come out of seed planting sweep 23 from passageways 65 and 66, respectively, and are deposited upon the seed-supporting shelf 36 while being forced out by the air system in a horizontal relationship to the ground.

Figure 7:
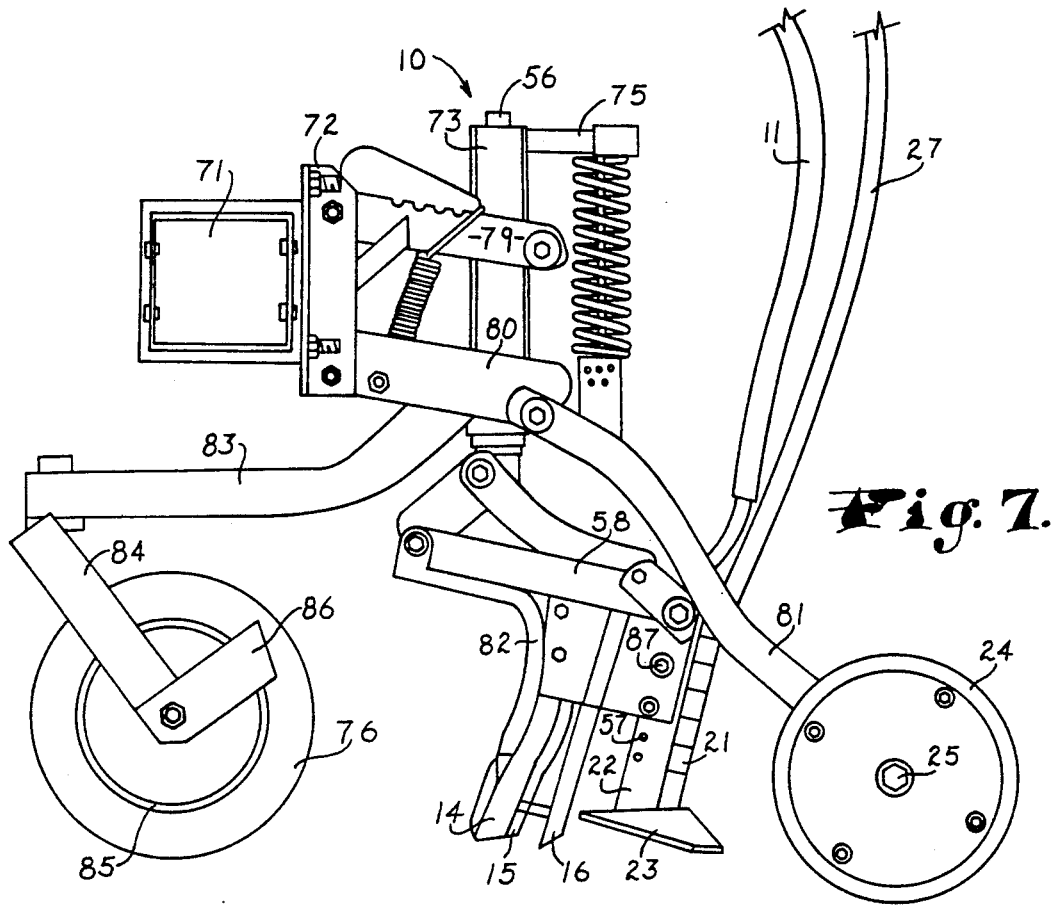
FIG. 7 is a side elevational view of the second embodiment of the multi-function implement of the instant invention in which the depth control is determined by use of a forward colter having depth bands.

With reference to FIG. 7, another embodiment is shown in which the depth control of the banding knife 14 is provided by a forwardly attached colter 76 having a band 85 which rotates across the top of the ground. Colter disc 76 precedes banding knife 14 so that any accumulated trash is sliced and the ground is initially pre-broken so that banding knife 14 which is a narrow banding knife does not shatter the ground. Colter 76 is attached by means of attachment arms 84 and 83 to depth adjustment 56 which moves colter wheel 76 in vertical relationship to knife 14. As will be noted in FIG. 7, vertical knife 14 and horizontal sweep 23 are rigidly connected so that the depth of the trench formed by knife 14 and the seed-supporting shelf formed by sweep 23 is constant. The adjustment between the the banding knife 14 and planting sweep 23 is by means of bolts 87 and bolt holes 57. Packer wheels 24 rotating around spindle 25 are attached by means of arm 81 to lower parallel linkage bar 80 and adjustable down pressure spring 74 which, by being attached between packer wheel arm 81 and down pressure arm 75, provide down pressure on the packer wheels 24 sufficient to cover the seeds after they have been planted. It will be noted that adjustable upright depth control tube 73, besides being attached to depth control colter support arm 83, is also pivotally attached to parallel linkage arms 79 and 80 which are in turn pivotally attached to tool bar support bracket 72 and ultimately to implement tool bar 71. As in the previous embodiment, seeds are provided through seed pneumatic tube 27 while fertilizer is provided to fertilizer tube 16 by way of fertilizer pneumatic tube 11 and anhydrous conduit 15. It will be noted from reference to FIG. 7 that FIG. 7's embodiment depicts other than a forward swept knife, although a forward swept knife could also be employed. The advantages of a forward swept knife are that soil penetration is better; however, a forward swept knife does disturb the soil. A backswept knife such as that depicted in FIG. 8 requires greater down pressure in order to achieve soil penetration; however, it does not disturb the soil as much as a forward swept knife.

It should be understood that the vertical trench opener or knife 14 can be attached under the planting sweep 23 forward of the planting sweep 23 or aft of planting sweep 23 without departing from the invention. If the knife is placed under sweep 23, the knife must be swept back to allow trash to be removed. The advantage of having the knife under planting sweep 23 is that the seed-supporting shelf 36 is less disturbed with that arrangement. Also, seed- and fertilizer-supply tubes 11 and 27 are arranged in a straightforward downward manner and do not require kinks or bends. Unfortunately, the farther aft the knife is placed with respect to sweep 23, the greater the amount of loss of ammonia if liquid or gaseous fertilizers are used since sweep 23 does seal those fertilizers if placed ahead of sweep 23.

Figure 8:
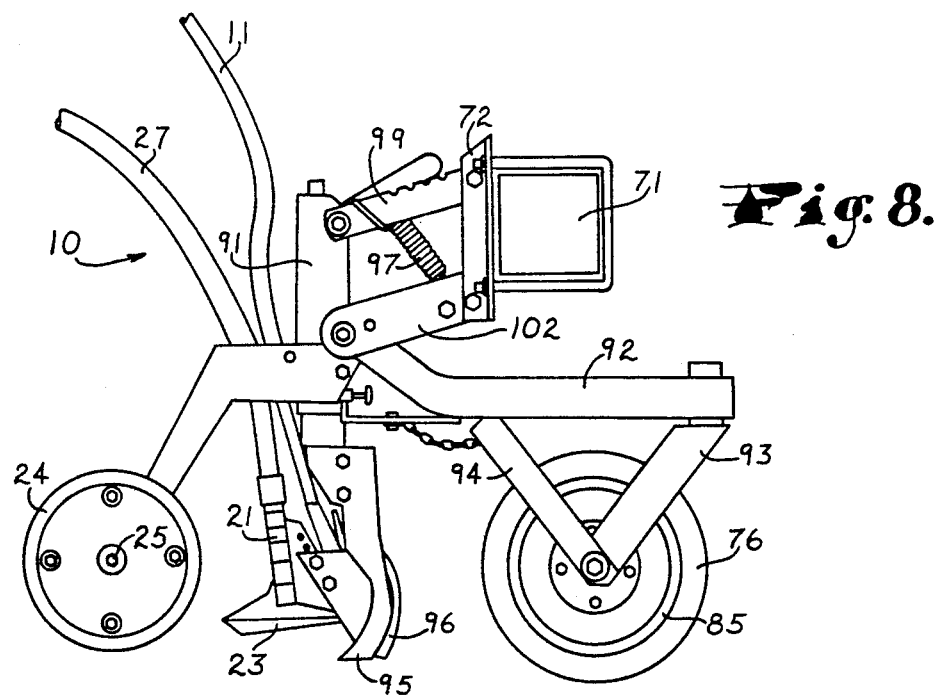
FIG. 8 is a side elevational view of the second embodiment of the multi-function implement of the instant invention in which the depth control is determined by both leading colter and trailing packer wheels.

Referring now to FIG. 8 where a third embodiment is shown in which both the forward colter 76 and trailing packer wheel 24 combine to provide depth control by being attached to a unitary planting sweep 23 with attached knife 95. Knife 95 is adjustable with respect to planting shoe 23 and the depth of the seed-supporting shelf and associated trench are controlled by their adjustable movement with respect to packer wheels 24 and colter wheel 76. The entire planting unit is thus attached to upright tubular support 91 which is pivotally attached by means of parallel linkage bars 99 and 102 to tool bar support bracket 72 and tool bar 71. By such an arrangement it can be seen that any upward movement or downward movement of colter 76 and packer wheel 24 will move planting shoe 23 and knife 95 in constant relationship. Knife 95 is depicted as a rearward sweeping knife located forward of sweep 23 and contains a wearing surface 96.

Figure 9:
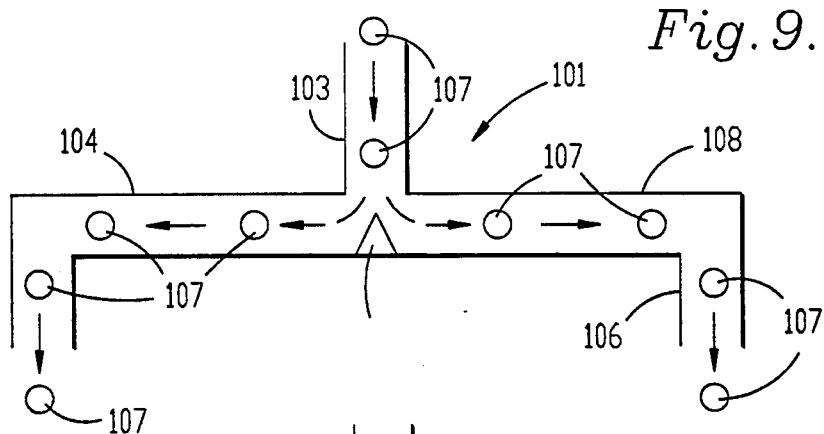
FIG. 9 is a cut-away end view of a second embodiment of the seeding sweep of the instant invention.

With respect to FIG. 9 where it is shown that a dividing planting shoe 103 could be attached to a planter of the invention 10 in lieu of the planting sweep. Dividing shoe 103 is provided with outwardly extending arms 104 and 108 which provide pneumatic seed passageways terminating in open terminus 105 and 106. With air pressure applied to planting shoe 101, seeds 107 will move down vertical passageway 103 until being divided by divider 108 to flow in either a right or left direction until they are deposited on either side as shown in FIG. 9. Open terminus 105 and 106 could be either open to the rearward portion of planting shoe 101 or directly down as depicted in FIG. 9.

Figure 10:
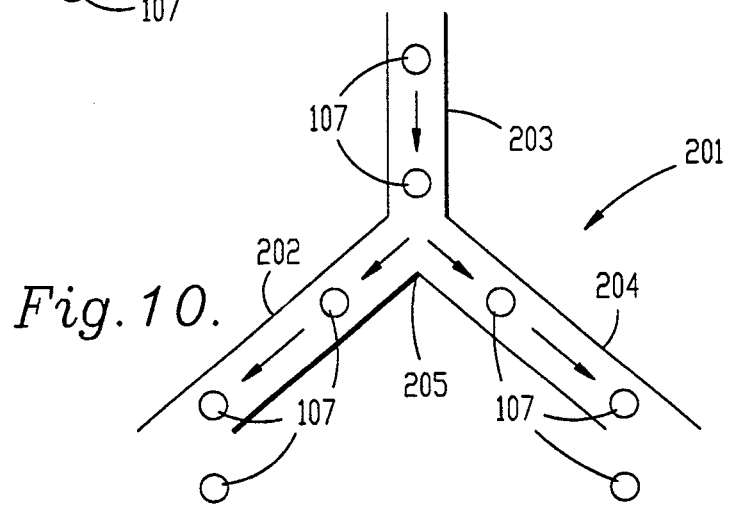
FIG. 10 is a cut-away end view of a third embodiment of the seeding sweep of the instant invention.

With reference to FIG. 10 it can be seen that another type of planting shoe 201 is provided in which the conduit 203 connected to the air seeder is further divided in a "Y" type of fitting into planting conduits 202 and 204. Any seeds 107 being forced down by the air seeder system are divided at junction point 205 so that the seeds 107 are split to either side and deposited in the ground. Either planting shoe 101 or 201 as depicted in FIGS. 9 and 10 would provide a parallel spaced row in accordance with the teachings of the instant invention.

With respect to FIG. 11 where it can be seen that planting shoe 23 having seed planting openings 65 and 66 is moving in a planting relationship creating trench 33 and seed-supporting shelf 36. It will be noticed that by the swirling nature of the air seeder attached to planting sweep 23, that seeds 307 alternate on one side with seeds 308 to provide a staggered pattern, thus making better use of any fertilizer deposited in trench 33 and increasing the yield thereby.

In all cases, banding knife 14 will serve to place the fertilizer in the ground along central trench 33 and the planting sweep 23 is capable of planting the seeds and discharging any accompanying starter fertilizer in parallel rows disposed to the opposite side of the path along which the deep fertilizer is placed within the ground. In this manner the relatively shallow planted seed will be provided sufficient starting fertilizer and when the resultant plants begin their growth into mature plants, their roots will receive sufficient nutrients from deep banded fertilizer.

From the foregoing it may be seen that implement 10 is capable of performing multiple functions in a single pass and in a manner constituting either a no till, minimum till, or conventional till planting operation.

The foregoing is considered as illustratively only of the principles of the invention, further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. In a seed planting unit for use with an air seeder having means for delivering a pressurized stream of air and seeds to the planting unit, the improvement in said planting unit comprising:

an upright knife for making a single vertical trench in the ground as the seeder is advanced,
   said knife having a lowermost extremity that forms the bottom of the trench;
   a fertilizer delivery conduit associated with said knife for use in delivering a band of fertilizer into the bottom of the trench prepared by the knife; and
   an opener having an inlet adapted to receive a pressurized stream of air and seeds and to deposit the seeds in the ground at a shallower depth than the fertilizer band,
   said opener being disposed in fore-and-aft alignment with said knife with respect to the path of travel of the seeder and having a transverse, leading, soil-engaging edge spaced above said lowermost extremity of the knife and extending outwardly beyond the knife in opposite lateral directions for producing a pair of seed-supporting shelves in substantially undisturbed soil along and outboard of opposite lateral sides of the trench above the bottom thereof,
   said opener further having passage means communicating with said inlet and including at least a pair of passages having trailing rearwardly opening seed discharge outlets located laterally outboard of the knife but inboard of the outermost extremities of said soil-engaging edge and at substantially the same level as said edge for depositing at least a pair of rows of seeds on the shelves on opposite sides of the single trench as the seeder is advanced,
   said outlets being spaced rearwardly from said edge and being separated from said edge by a fore-and-aft extending top surface of the opener causing soil to be lifted off the shelves at said edge, maintained above the shelves by the top surface until the seeds are deposited on the shelves, and then dropped back down on top of the seeds to cover the same.

2. In a seed planting unit as claimed in claim 1, said knife being disposed in leading relationship to the opener.

3. In a seed planting unit for use with an air seeder having means for delivering a pressurized stream of air and seeds to the planting unit, the improvement in said planting unit comprising:

an upright knife for making a vertical trench in the ground as the seeder is advanced,
   said knife having a lowermost extremely that forms the bottom of the trench;
   a fertilizer delivery conduit associated with said knife for use in delivering a band of fertilizer into the bottom of the trench prepared by the knife; and
   an opener having an inlet adapted to receive a pressurized stream of air and seeds and to deposit the seeds in the ground at a shallower depth than the fertilizer band,
   said opener being disposed in fore-and-aft alignment with said knife with respect to the path of travel of the seeder and having a transverse, leading, soil-engaging edge spaced above said lowermost extremity of the knife and extending outwardly beyond the knife in opposite lateral directions for producing a pair of seed-supporting shelves in substantially undisturbed soil along and outboard of opposite lateral sides of the trench above the bottom thereof,
   said opener having passage means communicating with said inlet and including at least a pair of passages having trailing rearwardly opening seed discharge outlets located laterally outboard of the knife but inboard of the outermost extremities of said soil-engaging edge and at substantially the same level as said edge for depositing at least a pair of rows of seeds on the shelves on opposite sides of the trench as the seeder is advanced,
   said outlets being spaced rearwardly from said edge and being separated from said edge by a fore-and-aft extending top surface of the opener causing soil to be lifted off the shelves at said edge, maintained above the shelves by the top surface until the seeds are deposited on the shelves, and then dropped back down on top of the seeds to cover the same,
   said knife being disposed in trailing relationship to the opener.

4. In a seed planting unit as claimed in claim 1,
   said inlet of the opener including an upright seed conduit having internal splitter means at the bottom thereof for dividing a single stream of air and seeds into a pair of stream flowing through said passages,
   said passages diverging outwardly and rearwardly from the central conduit and being closed at the bottom along the entire fore-and-aft length thereof,
   said outlets being disposed in an upright, rear edge of the opener at the rear of said passages.

5. In a seed planting unit for use with an air seeder having means for delivering a pressurized stream of air and seeds to the planting unit, the improvement in said planting unit comprising:

an upright knife for making a vertical trench in the ground as the seeder is advanced,
   said knife having a lowermost extremely that forms the bottom of the trench;
   a fertilizer delivery conduit associated with said knife for use in delivering a band of fertilizer into the bottom of the trench prepared by the knife; and
   an opener having an inlet adapted to receive a pressurized stream of air and seeds and to deposit the seeds in the ground at a shallower depth than the fertilizer band,
   said opener being disposed in fore-and-aft alignment with said knife with respect to the path of travel of the seeder and having a transverse, leading, soil-engaging edge spaced above said lowermost extremity of the knife and extending outwardly beyond the knife in opposite lateral directions for producing a pair of seed-supporting shelves in substantially undisturbed soil along and outboard of opposite lateral sides of the trench above the bottom thereof,
   said opener further having passage means communicating with said inlet and including at least a pair of passages having trailing rearwardly opening seed discharge outlets located laterally outboard of the knife but inboard of the outermost extremities of said soil-engaging edge and at substantially the same level as said edge for depositing at least a pair of rows of seeds on the shelves on opposite sides of the trench as the seeder is advanced.

said outlets being spaced rearwardly from said edge and being separated from said edge by a fore-and-aft extending top surface of the opener causing soil to be lifted off the shelves at said edge, maintained above the shelves by the top surface until the seeds are deposited on the shelves, and then dropped back down on top of the seeds to cover the same, said inlet of the opener including an upright seed conduit having internal splitter means at the bottom thereof for dividing a single stream of air and seeds into a pair of stream flowing through said passages, said passages diverging outwardly and rearwardly from the central conduit and being closed at the bottom along the entire fore-and-aft length thereof, said outlets being disposed in an upright, rear edge of the opener at the rear of said passages, said upright conduit having an internal sidewall of circular cross-section provided with a vertically extending series of transverse, parallel ripples to cause the stream of air and seeds to swirl as the stream moves downwardly through the conduit toward the splitter means.

6. In a seed planting unit as claimed in claim 1,
said opener including a generally flat, triangular sweep having a forwardmost apex and a pair of laterally outwardly projecting wings,
said wings having leading edges which diverge from said apex and present said transverse soil-engaging edge of the opener.

7. In a seed planting unit for use with an air seeder having means for delivering a pressurized stream of air and seeds to the planting unit, the improvement in said planting unit comprising:
an upright knife for making a vertical trench in the ground as the seeder is advanced,
said knife having a lowermost extremely that forms the bottom of the trench;
a fertilizer delivery conduit associated with said knife for use in delivering a band of fertilizer into the bottom of the trench prepared by the knife; and
an opener having an inlet adapted to receive a pressurized stream of air and seeds and to deposit the seeds in the ground at a shallower depth than the fertilizer band,
said opener being disposed in fore-and-aft alignment with said knife with respect to the path of travel of the seeder and having a transverse, leading, soil-engaging edge spaced above said lowermost extremity of the knife and extending outwardly beyond the knife in opposite lateral directions for producing a pair of seed-supporting shelves in substantially undisturbed soil along and outboard of opposite lateral sides of the trench above the bottom thereof,
said opener further having passage means communicating with said inlet and including at least a pair of passages having trailing rearwardly opening seed discharge outlets located laterally outboard of the knife but inboard of the outermost extremities of said soil-engaging edge and at substantially the same level as said edge for depositing at least a pair of rows of seeds on the shelves on opposite sides of the trench as the seeder is advanced,
said outlets being spaced rearwardly from said edge and being separated from said edge by a fore-and-aft extending top surface of the opener causing soil to be lifted off the shelves at said edge, maintained above the shelves by the top surface until the seeds are deposited on the shelves, and then dropped back down on top of the seeds to cover the same,
said opener including a generally flat, triangular sweep having a forwardmost apex and a pair of laterally outwardly projecting wings,
said wings having leading edges which diverge from said apex and present said transverse, soil-engaging edge of the opener,
said opener further including an upright conduit projecting upwardly from the sweep and presenting said inlet,
said wings extending rearwardly beyond said conduit and being separated from one another to define an open space therebetween behind the conduit,
said passages intersecting with said conduit at the bottom of the latter and diverging outwardly and rearwardly therefrom within the wings to a location spaced rearwardly beyond the conduit.

8. In a seed planting unit as claimed in claim 1,
said unit having mean for mounting the knife onto the front of a generally C-shaped, rearwardly arched shank and the opener onto the rear of the shank.

9. In a seed planting unit as claimed in claim 8,
said mounting means including structure for permitting the opener to adjustably float up and down relative to the knife and means for yieldably biasing the opener downwardly relative to the knife,
said opener having a trailing press wheel coupled therewith in a manner to engage the top surface of the ground and prevent relative vertical movement between the press wheel and the opener during floating movement of the opener relative to the knife whereby to limit downward movement of the opener relative to the knife.

10. In a seed planting unit as claimed in claim 9,
said press wheel being coupled with the opener in a manner to permit selective vertical positioning of the press wheel relative to the opener.

11. In a seed planting unit as claimed in claim 1,
said planting unit including mounting structure positioning said opener behind said knife in a manner to prevent relative vertical movement between the opener and the knife during forward movement through the ground.

12. In a seed planting unit as claimed in claim 11,
said planting unit including a coulter positioned forwardly of said knife in fore-and-aft alignment with the knife and the opener for preparing an opening slit in the ground ahead of the knife,
said coulter including a circular, depth control band for engaging the top of the ground as the planting unit moves forwardly,
said mounting structure including means for preventing relative vertical movement between the coulter and the knife and opener during forward movement of the planting unit whereby to cause the coulter to provide depth control for the knife and the opener.

13. In a seed planting unit as claimed in claim 12, said mounting structure including means for selective control adjustment of the coulter relative to the knife and the opener.

14. In a seed planting unit as claimed in claim 13,
said planting unit further including a press wheel trailing said seed opener in position for engaging the top of the ground as the planting unit moves forwardly,
said press wheel being mounted for floating vertical movement relative to the opener during forward movement of the planting unit and including means for yieldably biasing the press wheel toward the ground.

15. In a seed planting unit as claimed in claim 11,
said mounting structure including means for selectively adjusting the vertical position of the opener relative to the knife.

16. In an opener for preparing a seed bed below the top surface of the ground and depositing seeds onto the seed bed, the improvement comprising:
a subsurface portion adapted to operate below the surface of the ground during use and an above surface portion projecting upwardly from said subsurface portion and adapted to operate at least partially above the surface of the ground during use of the opener,
said substrate portion having a leading, transverse edge extending laterally outwardly to the laterally outermost extremes of the subsurface portion and adapted to prepare one or more generally horizontal shelves in the soil as the opener is advanced,
said transverse edge being disposed forwardly of said upright portion and extending outwardly beyond the upright portion in opposite lateral directions,
said upright portion including a conduit for receiving a single stream of air and seeds from a remote source and directing the steam downwardly toward means for splitting the single stream into two separate streams,
said subsurface portion including a pair of internal passages having forward ends intersecting with said conduit at the bottom of the latter for receiving the two separate streams and rear discharge outlets spaced rearwardly from the conduit and mutually laterally spaced from one another,
said subsurface portion extending rearwardly beyond said bottom of the conduit and terminating in a generally upright, rearmost edge having said discharge outlets disposed therein,
said passages being entirely closed along the top, bottom and sides thereof until reaching said outlets whereby to assure rearward discharge of the seeds from the opener and onto said shelf as the opener moves forwardly,
said conduit being circular in internal cross-section and having internal upright sidewalls provided with an upright series of transverse ripples for causing the stream of air and seeds to swirl as the stream approaches the bottom of the conduit.

17. In an opener as claimed in claim 16,
said subsurface portion comprising a generally flat, triangular sweep having a forwardmost apex and a pair of laterally outwardly projecting wings,
said wings having leading edges which diverge from said apex and present said transverse edge of the subsurface portion.

18. In an opener as claimed in claim 17,
said wings extending rearwardly beyond the bottom of the conduit and being laterally separated from one another to define an open space therebetween behind the conduit,
said passages diverging outwardly and rearwardly from their point of intersection with the bottom of the conduit.

19. In a planting method, the improvement comprising:
preparing a vertical trench in the soil;
depositing a band of fertilizer in the bottom of the trench immediately behind the leading extremity of the trench as the trench is being prepared;
moving through the soil with a transverse edge which is symmetrical with the trench and has a width exceeding that of the trench in opposite, lateral directions so that the edge encounters substantially undisturbed soil outside of the trench,
said transverse edge being held at a shallower depth than the bottom of the trench during said movement of the edge whereby to produce a pair of shelves in the substantially undisturbed soil along and outboard of opposite sides of the trench above the bottom of the latter; and
depositing at least two parallel rows of seeds on opposite sides of each trench on said shelves before covering the shelves with soil whereby to provide a deep source of fertilizer for the seeds after germination while protectively isolating the seeds from the deep fertilizer prior to germination.

20. In a planting method as claimed in claim 19,
said step of preparing a vertical trench being carried out forwardly of the point of engagement of the soil with said transverse edge.

21. In a planting method, the improvement comprising:
preparing a vertical trench in the soil;
depositing a band of fertilizer in the bottom of the trench immediately behind the leading extremity of the trench as the trench is being prepared;
moving through the soil with a transverse edge which is symmetrical with the trench and has a width exceeding that of the trench in opposite, lateral directions so that the edge encounters substantially undisturbed soil outside of the trench,
said transverse edge being held at a shallower depth than the bottom of the trench during said movement of the edge whereby to produce a pair of shelves in the substantially undisturbed soil along and outboard of opposite sides of the trench above the bottom of the latter; and
depositing at least two parallel rows of seeds on opposite sides of the trench on said shelves before covering the shelves with soil whereby to provide a deep source of fertilizer for the seeds after germination while protectively isolating the seeds from the deep fertilizer prior to germination,
said step of preparing a vertical trench being carried out rearwardly of the point of engagement of the soil with said transverse edge.

22. In a planting method as claimed in claim 19,
said step of depositing seeds on the shelves including blowing the seeds rearwardly with a certain velocity as the transverse edge is moved forwardly at a certain speed.

23. In an air-assisted undercut seeder having a pair of rearwardly diverging blade edges that cut through the soil as the seeder is advanced to create a generally flat, horizontal seedbed that passes beneath the seeder, and a central body between said blade edges that lifts and holds loose, undercut soil from the blade edges up off the seedbed until after the rear of the body has passed by, the improvement comprising:

a central conduit projecting upwardly from the body for receiving a stream of air and seeds from a remote source, said body extending rearwardly beyond the conduit an opposite sides thereof to present a trailing portion behind the conduct that has rearwardly facing air and seed outlets spaced entirely rearwardly behind the point of intersection of the conduit with the body; and means defining a pair of fore-and-aft extending, internal, generally horizontal passages within the body that intersect with the conduit adjacent a lower end of the conduit and diverge rearwardly therefrom through the trailing portion of the body to said outlets on opposite lateral sides of the conduit, said conduit having means adjacent said lower end thereof for splitting the incoming stream into two separate streams and directing the same into the passages, each of said passages having a closed, elongated bottom wall extending generally horizontally rearwardly from the conduit back to the outlet of the passage for preventing discharge of seeds through the bottom of the body and for causing the sees to be blow out the rear of the body in rearwardly directed, generally horizontal steams beneath the lifted, undercut soil.

24. In an air-assisted seeder as claimed in claim 23, said trailing portion of the body having upright rear edge means at the rear of the body, said outlets being located in said upright rear edge means.

25. In an air-assisted seeder as claimed in claim 24, said body having an open area behind the conduit separating said trailing portion into a pair of laterally spaced trailing sections.

26. In an air-assisted seeder as claimed in claim 25, said rear edge means comprising an upright rear edge on each of said trailing sections respectively, there being an outlet in each of said rear edges.

27. In an air-assisted seeder as claimed in claim 24, said body having a closed top surface behind the conduit spanning the distance between said bladed edges.

28. In an air-assisted seeder as claimed in claim 27, said rear edge means comprising a continuous upright rear edge on said trailing portion of the body, said outlets being in said continuous edge.

29. In an air-assisted seeder as claimed in claim 23, said conduit being circular in internal cross-section and having internal upright sidewalls provided with an upright series of transverse ripples for causing the stream of air and seeds to swirl as the stream approaches the bottom of the conduit.

30. In a method of seed planting, the improvement comprising:

advancing an undercutting blade along a path of travel below and generally parallel to the surface of the ground whereby to produce a flat, generally horizontal seedbed that passes beneath the advancing blade as the blade moves along its path of travel;

lifting loose undercut soil off the seedbed as it is cut by the blade and keeping the lifted soil from returning to the seedbed until after seeds have been deposited on the seedbed; and blowing a pressurized stream of air and seeds into a distributor body associated with the blade below the surface of the ground and splitting the stream into a pair of separate steams that are propelled horizontally rearwardly out the back of the body between the overhead flow of loose undercut soil and the underlying seedbed whereby to case the seeds to thereafter drop from the streams onto the seedbed and become covered by the loose soil at a location behind the blade.

31. A method of seed planting as claimed in claim 30, said separate streams diverging laterally outwardly in opposite directions as they are propelled horizontally rearwardly from the body.

32. A method of seed planting as claimed in claim 30, said pressurized stream being passed through a transversely rippled conduit just prior to said splitting step whereby to case the airborne seeds to impinge upon the ripples to promote swirling of the seeds.

33. A method of seed planting as claimed in claim 32, said splitting steps including presenting the stream of swirling seeds to an intersection between the conduit and a pair of separate passages branching off the conduit, there being diverter structure located at the intersection for randomly diverting the seeds from the conduit into respective ones of the passages.

34. A method of seed planting as claimed in claim 30, and the additional steps of:

making a vertical trench in the ground with an upright knife as the blade is advanced such that the trench is located generally in the center of the seedbed and projects down deeper than the seedbed to locate the bottom of the trench below the level of the seedbed; and delivering a band of fertilizer into the bottom of the trench to thereby position the band below and equidistantly between the rows of seeds on the seedbed formed by the pair of streams issuing from the back of the body.

35. A method of seed planting as claimed in claim 34, said knife being positioned in leading relationship to the blade whereby to make the trench ahead of the seedbed as the blade is advanced.

36. A method of seed planting as claimed in claim 34, said knife being positioned in trailing relationship to the blade whereby to make the trench after the seedbed is produced.

* * * * *